United States Patent
Tanaka et al.

(10) Patent No.: US 9,124,374 B1
(45) Date of Patent: Sep. 1, 2015

(54) TRANSMITTER OPTICAL MODULE OUTPUTTING AN OPTICAL SIGNAL CONTAINING TWO OR MORE WAVELENGTHS

(71) Applicant: Sumitomo Electric Industries, Ltd., Osaka-shi (JP)

(72) Inventors: Keiji Tanaka, Yokohama (JP); Phillip Edwards, San Jose, CA (US)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 14/222,198

(22) Filed: Mar. 21, 2014

(51) Int. Cl.
*H04B 10/04* (2006.01)
*H04B 10/564* (2013.01)

(52) U.S. Cl.
CPC ................................ *H04B 10/564* (2013.01)

(58) Field of Classification Search
CPC .... H04B 10/50; H04B 10/504; H04B 10/564; H04B 10/506
USPC ......... 398/182, 183, 186, 187, 188, 192, 193, 398/194, 195, 196, 197, 198, 200, 201, 135, 398/136, 25, 33, 38, 79, 93, 94, 95, 32
See application file for complete search history.

(56) References Cited

U.S. PATENT DOCUMENTS 8,036,534 B2 * 10/2011 Matsumoto ..................... 398/95
8,611,761 B2 * 12/2013 Takei et al. .................... 398/197

FOREIGN PATENT DOCUMENTS

| JP | 07-336307 A | 12/1995 |
|----|----|----|
| JP | 2000-151012 A | 5/2000 |

* cited by examiner

*Primary Examiner* — Hanh Phan
(74) *Attorney, Agent, or Firm* — Venable LLP; Michael A. Sartori

(57) ABSTRACT

A transmitter module is disclosed, where the transmitter module includes optical sources, an optical multiplexer to multiple optical signals each output from optical sources, an optical detector to detect an output of the optical multiplexer, and a controller. The controller alternately superposes a dither signal on a bias current provided to the optical source, and the bias current is controlled based on a magnitude of the dither signal, which is detected by a configuration similar to the lock-in amplifier.

15 Claims, 6 Drawing Sheets

TRANSMITTER OPTICAL MODULE OUTPUTTING AN OPTICAL SIGNAL CONTAINING TWO OR MORE WAVELENGTHS

BACKGROUND OF THE INVENTION

1. Field of the Invention

The present application relates to a transmitter optical module that outputs an optical signal containing two or more wavelengths.

2. Related Background Art

Recent optical communication has continuously requested to increase the capacity thereof drastically. Conventional systems, such as the full-duplex system, do not give a satisfactory solution for the request above. One practical solution is the wavelength division multiplexing (WDM) system where two or more optical signals each having a specific wavelength different from others are wavelength multiplexed and thus multiplexed optical signal is transmitted through a single fiber. The QSFP+ standard, which is one of multi-source agreements for a pluggable optical transceiver, has ruled that four optical signals each having a wavelength in 1.3 μm band and a transmission speed of 10 Gbps or 25 Gbps are multiplexed to realize a total speed of 40 Gbps or 100 Gbps.

Japanese Patent Applications published as JP-H07-336037 and JP-2000-151012 have disclosed another type of such optical transceivers with the wavelength multiplexing function. The optical source that multiplexes the wavelengths inherently needs, as described above, a plurality of optical sources each being controlled in optical output power thereof by, for instance, automatic power control (APC) circuit. When optically active devices, half of which emit optical signals; while, the rests monitor respective optical output power, are concurrently installed in a housing, entanglement between the light emitting devices and light receiving devices becomes a problem. In order to control the output power of the specific light emitting device, the precise and accurate monitoring of the optical power output therefrom becomes inevitable.

However, a request to make the size in compact is always raised even when an optical transceiver has the wavelength multiplexing function, which inevitably causes the accuracy of the monitored output power of the optical sources. That is, when the optical output of a target device is to be monitored, the devices except for the target device always influences the monitored output power, which degrades the accuracy of the detection and causes the poor control of the optical output power.

SUMMARY OF THE INVENTION

The present application relates to a transmitter optical module that has the function of the wavelength multiplexing. One example of the transmitter module includes a plurality of optical sources, an optical multiplexer, an optical detector, an extractor, and a controller. Each of the optical sources, which are typically semiconductor laser diodes (LDs), emits an optical signal with a wavelength specific thereto and different from others. The optical multiplexer multiplexes the optical signals into a multiplexed optical signal transmitted through a single fiber. The optical detector, which is typically a semiconductor photodiode (PD) receives the multiplexed optical signal and generates a detected signal. The extractor includes an electrical signal source to provide an electrical signal having a specific frequency, a delay unit to adjust a phase of the electrical signal and a multiplier. The controller includes an auto-power control (APC) circuits each corresponding to the LD and providing a bias current to the LD. A feature of the transmitter optical module is that the electrical signal is superposed on the bias current one after another, and the extractor extracts a component having the specific frequency by multiplying the electrical signal whose phase is adjusted by the delay unit with the detected signal. Then, the bias current is determined by the component thus extracted by the extractor.

Another example of a transmitter optical module includes a plurality of LDs, an optical multiplexer, a PD, and a controller different from those of the aforementioned controller. This controller includes a plurality of APCs each having an extractor with an electrical signal source, a delay unit, and a multiplier. Each of the electrical signal source, the delay unit and the multiplier has the arrangement and the function same as those of the aforementioned units. A feature of the present transmitter module is that each of the APCs superposes the electrical signal on the bias current, extracts a component having the specific frequency from the detected signal provided from the PD by multiplying the electrical signal with adjusted phase by the delay unit with the detected signal, and determines the bias current based on the component thus extracted by the extractor. A key feature of the controller of this example is that respective APCs includes the extractor; while, the aforementioned example provides the one extractor common to the APCs.

Still another example of a transmitter optical module includes a plurality of LDs, an optical multiplexer, a plurality of PDs, and a controller. The controller includes a plurality of APCs each having the arrangement same as those of the last APC. That is, each of the APC includes an extractor. A feature of this transmitter optical module is that the PDs are presented to detect an optical output of respective LDs preceding the multiplexing by the optical multiplexer. The detected signal by the PD reflects the optical signal coming not only from the LD corresponding thereto but other LDs. By setting the frequency of the electrical signal generated by the extractor specific to the LD and different from others, the optical signal unique to the LD may be detected.

BRIEF DESCRIPTION OF THE DRAWINGS

The foregoing and other purposes, aspects and advantages will be better understood from the following detailed description of a preferred embodiment of the invention with reference to the drawings, in which.

DESCRIPTION OF THE PREFERRED EMBODIMENTS

Next, some embodiments according to the present embodiment will be described as referring to drawings. In the description of the drawings, numerals or symbols same or similar to each other will refer to elements similar or same to each other without overlapping explanations.

Figure 1:
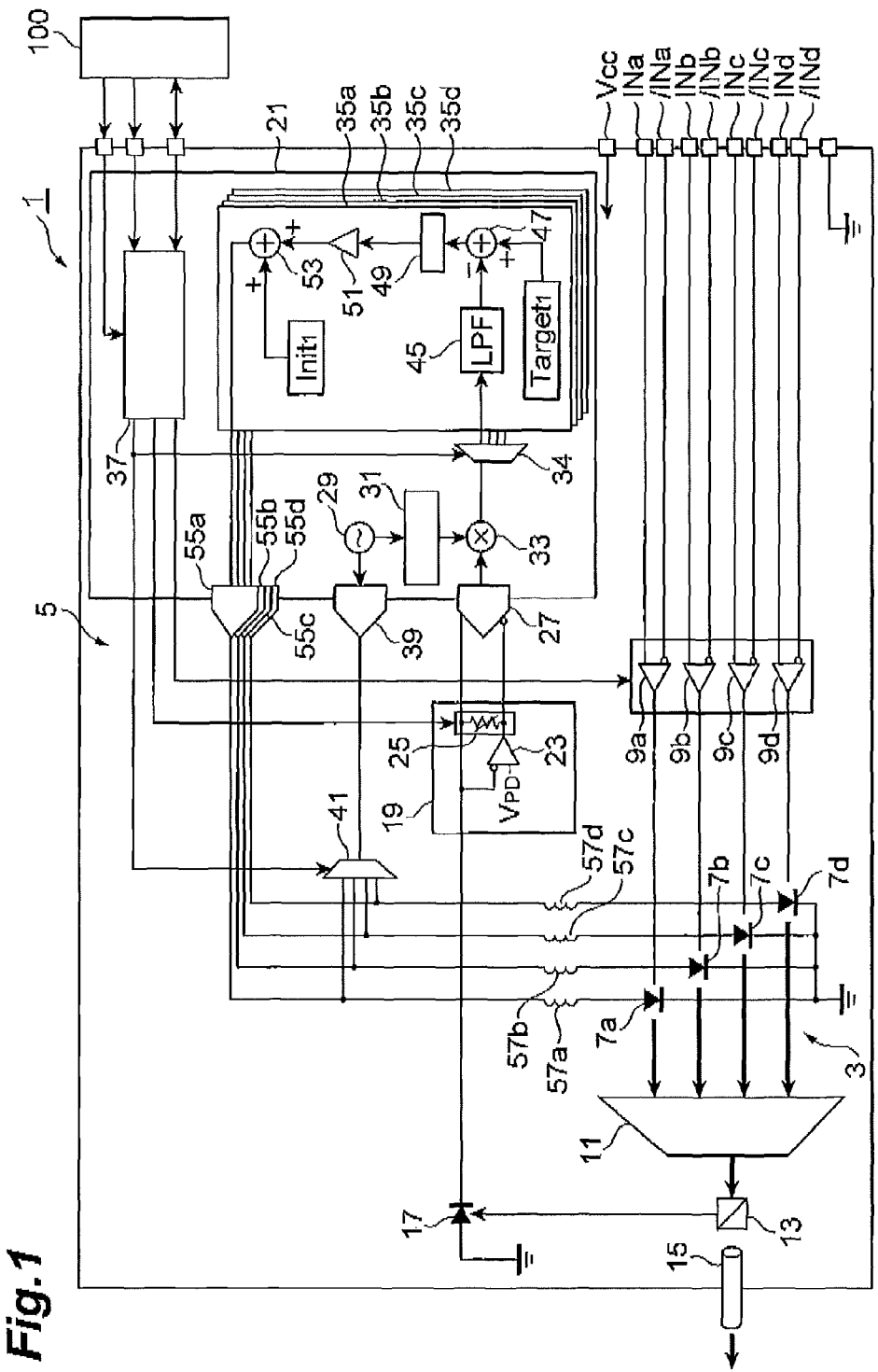
FIG. 1 is a block diagram of an optical module according to an embodiment of the invention.

FIG. 1 is a block diagram of a transmitter optical module 1 having the wavelength multiplexing function according to an embodiment of the present application. The transmitter module 1 comprises an optical unit 3 and an electrical unit 5. The optical unit 3 includes four LDs, 7a to 7d, each emitting an optical signal with a specific wavelength different from others, four drivers, 9a to 9d, each driving the LD corresponding thereto, an optical multiplexer 11 to multiplex optical signals coming from the LDs, 7a to 7d, a beam splitter (BS) 13 to split the multiplexed optical signal into two beams, an optical fiber 15 to guide one of the multiplexed optical signal externally, and a PD 17 to detect the output of the BS 13. The electrical unit 5 has a power monitor 19 to amplify the output of the PD 17 in analog, and a digital controller 21 having a plurality of APC units each supplying a bias current to the LD, 7a to 7d. The optical fiber 15 is replaceable to a coupling unit to couple an external fiber optically with the BS 13.

The electrical unit 5 will be described in detail.

The power monitor 19 is a type of the trans-impedance amplifier (TIA) including a differential amplifier 23 and a feedback resistor 25. The TIA converts a photocurrent, which is generated by the PD 17 and substantially proportional to the optical power output from the BS 13, into a voltage signal. Specifically, the inverting input of the differential amplifier 23 is connected to the cathode of the PD 17; while, the non-inverting input thereof receives a reference Vpd corresponding to the bias voltage supplied to the PD. The feedback resistor 25 is put between the inverting input of the differential amplifier 23 and the output thereof. The output of the power monitor 19, which corresponds to a voltage drop at the feedback resistor 25 caused by the photocurrent measured from the reference Vpd, is brought to the analog-to-digital converter (A/D-C) 27 of the controller 21 to be converted into a digital signal.

The controller 21 includes a signal source 29 to generate a dither signal, a delay unit 31 put in downstream of the signal source 29, a multiplier 33 coupled to both of the signal source 29 and the A/D-C 27, a selector 34 put in a downstream of the multiplier 33, four APCs, 35a to 35d, put in the downstream of the selector 34, where each of APCs, 35a to 35d, controls a bias current provided to respective LDs, 7a to 7d, a processor 37 configured to control the whole operation of the transmitter optical module 1 as communicating with an external host 100, and another selector 41 coupled with the signal source 29 through a digital-to-analog converter (D/A-C) 39. The signal source 29, the delay unit 31, and the multiplier 33 constitute an extractor.

Each of four APCs, 35a to 35d, where they have a function and an arrangement same to each other, includes a low-pass filter (LPF) 45 configured to receive the output of the selector 34, a subtractor 47, an integrator 49, an amplifier 51, and an adder 53, where these elements, 45 to 53, are put in the downstream of the selector 34 in this order. The output of the adder 53 is provided to the anodes of the LD, 7a to 7d, through the D/A-Cs, 55a to 55d, and inductors, 57a to 57d.

In the electrical unit 5 thus described, the output of the power monitor 19, which corresponds to the detected signal, is input to the A/D-C 27 to be converted into a digital signal, and multiplied with the dither signal digitally in the multiplier 33. The multiplication may extract only one component whose frequency is identical with the frequency of the dither signal. The output of the multiplier 33 is selectively provided to one of APCs, 35a to 35d, and the selected APC generates a bias current based on the output of the multiplier 33. That is, the output of the multiplier 33 is converted through the LPF 45 into a DC signal corresponding to the optical power detected by the PD 17. The subtractor 47 compares thus converted DC signal with a preset target, and outputs a signal to drive the integrator 49 and the amplifier 51 such that the input DC signal becomes equal to the preset target. The output of the amplifier 51 is selectively provided to one of LDs, 7a to 7d, as a bias current after being added an initial value $Init_1$, subsequently converted into an analog signal by the D/A-C, 55a to 55d. Thus, the bias current provided to the LDs, 7a to 7d, are controlled such that the average output power thereof becomes close to, substantially equal to, the preset target power.

The dither signal, which is generated in the controller 21, is provided not only to the multiplier 33 through the delay unit 31 but to one of LDs, 7a to 7d, selected by the selector 41 after converting into an analog signal by the D/A-C 39 and superposed on the bias current provided to the selected LD, 7a to 7d. In other words, the dither signal is superposed on the bias current provided to one of LDs, 7a to 7d, corresponding to one APC circuit selected by the selector 34. Such a selection of the APC circuits and the LD by the selectors, 41 and 34, are controlled by the processor 37. The bias current is supplied to the selected LD, 7a to 7d, through respective inductors, 57a to 57d, to cut high frequency components. Thus, the APC feedback loops operating digitally are constituted for respective LDs, 7a to 7d.

The LDs, 7a to 7d, are not only controlled in DC mode by receiving the bias currents determined by respective APC feedback loops described above, but driven in AC mode by modulation signals externally provided to terminals, INa to INd and /INa to /INd, through the drivers, 9a to 9d. The terminals denoted by, for instance, INa and /INa, receives signals complementary or differential to each other, that is, a signal provided to the terminal INa and another signal provided to the terminal /INa have a phase difference of 180°. The optical signal output from the LD 7a is modulated by a mono-phase signal converted from the complementary signal provided to the terminals, INa and /INa. The amplitude of the mono-phase signals that drive respective LDs, 7a to 7d, is adjusted by the controller 37 such that the extinction ratio of the optical signal output from respective LDs, 7a to 7d, becomes a preset value. Respective output signals of the LDs, 7a to 7d, have specific wavelengths different from others. For example, the emission wavelengths of the LDs, 7a to 7d, follow the standard of the CWDM (Coarse Wavelength Division Multiplexing), DWDM (Dense Wavelength Division Multiplexing), LAN-WDM (Local Area Network Wavelength Division Multiplexing), and so on. The optical multiplexer 11 multiplexes the optical signals coming from respective LDs, 7a to 7d, and having the wavelengths different from other, and outputs thus multiplexed optical signals.

Next, the APC feedback loop by the electrical unit 5 will be further described.

The processor 37 first outputs a signal to select one of the LDs, 7a to 7d, to the selectors, 34 and 41. Then, the dither signal, which is generated by the signal source 29 and converted to an analog form by the D/A-C 39, is provided as the bias current to one of LDs, 7a to 7d, as superposing on one of outputs of the D/A-Cs, 55a to 55d, selected by the selector 41. The ratio of the output of the D/A-C 39 for the dither signal against those of other D/A-Cs, 55a to 55d, is set to be 5 to 10%, namely, a minimum value necessary for the lock-in operation by the multiplier 33 described below.

An explanation below assumes that the selectors, 34 and 41, select the LD 7b. Although the LD 7b that receives a bias current superposed on the dither signal is also driven by the modulation signal provided to the terminals, INb and /INb;

the interference between two AC signals, one of which is the dither component and the other is the modulation signal, is substantially avoidable by setting frequencies thereof in respective frequency bands far different from others. For instance, when the modulation signal has frequency components primarily of 10 GHz, the interference from the dither signal to the modulation signal is substantially ignorable by setting the frequency of the dither signal to be 1 kHz, which is $\frac{1}{10}^7$ of that of the modulation signal. Moreover, the magnitude of the dither signal is about $\frac{1}{10}$ or less of that of the modulation signal. Thus, the LD 7b is substantially driven in AC mode only by the modulation signal. The other LDs, 7a, 7c and 7d, are provided with respective bias current free from the dither signal. The optical signals each coming from respective LDs, 7a to 7d, are multiplexed optically by the multiplexer 11 and a portion of the multiplexed optical signal divided by the optical beam splitter 13 is output from the module 1. A rest portion of the multiplexed optical signal enters the monitor PD 17. When a magnitude of the optical beam divided by the beam splitter 13 and enters the monitor PD is large, the APC feedback loop becomes stable; however, the output optical power of the module 1 becomes small. An adequate and optimum ratio is selected.

The present embodiment implements a phase synchronizing amplifier, or the extractor, which is generally called as a lock-in amplifier. The lock-in amplifier is originally used for detecting a faint signal buried in noise. Because of the noise tolerance thereof, the lock-in amplifier may extract the substantial signal even when the magnitude of the dither component is small enough and the branching ratio of the beam splitter 13 is also small. Accordingly, even a conventional APC circuit needs a branching ratio of the beam splitter around 10% for the stable feedback control of the APC circuit, the present embodiment using the lock-in amplifier realizes the stable feedback even when the branching ratio is less than a few percent.

Moreover, the present optical module includes a plurality of LDs, 7a to 7d, namely four LDs. Under such a situation, even respective LDs emit light with even power and the branching ratio of the beam splitter is 10%, the contribution of the specific LD 7b in the monitored light to the total monitored power decreases to 2.5%, namely ¼ of 10%. The lock-in amplifier becomes extremely effective for extracting a specific frequency component from a faint optical signal.

Specifically, the monitor PD 17 monitors branched optical signal containing all wavelengths of the optical signals output from the LDs 7a to 7d, and generates a photocurrent proportional to the monitored optical power. The photocurrent is provided to the TIA put in the downstream of the PD 17. The TIA is a type of the inverting amplifier using an operational amplifier (Op-Amp). The Op-amp operates to set two inputs, the inverting and non-inverting inputs, to be imaginary short-circuit. That is, because the non-inverting input of the Op-Amp receives a reference voltage $V_{PD}$, the inverting input of the Op-Amp is imaginarily set in $V_{PD}$; then, the monitor PD 17 is biased by this reference voltage $V_{PD}$. While, the photocurrent generated in the monitor PD 17 flows in the feedback resistor 25 and pulls into the output of the Op-amp when the input impedance of the Op-Amp and that of the A/D-C 27 are high enough, which induces a voltage drop in the feedback resistor 25 whose magnitude is proportional to the magnitude of the photocurrent. The A/D-C 27 detects this voltage drop and converts it into a digital form.

The controller 21 performs the following: AC components of the output of the A/D-C 27, which corresponds to the output of the monitor PD 17, is multiplied with the dither signal by the multiplier 33. Assuming the dither signal has a frequency of $\omega$ (=$2\pi f$), the dither signal and the AC component of the detected signal are denoted as A=a×sin($\omega t$) and B=b×sin($\omega t+\theta$), respectively. The phase of the detected signal B does not always match with that of the dither signal A. The multiplication Y of two signals results in the equation below:

$$\begin{aligned}
Y &= \{a \times \sin(\omega t)\} \times \{b \times \sin(\omega t + \theta)\} \\
&= ab \times \{\cos(2\omega t) + 1\}/2 & (\theta = 0) \\
&= ab \times \sin(2\omega t)\}/2 & (\theta = \pi/2) \\
&= ab \times \{\cos(2\omega t) - 1\}/2 & (\theta = \pi) \\
&= -ab \times \sin(2\omega t)/2 & (\theta = 3\pi/2).
\end{aligned}$$

Accordingly, the DC component of the output of the multiplier 33 varies between two values of ab/2 and -ab/2. Matching the phase of the dither signal with that of the detected signal, namely $\theta=0$, the output of the multiplier 33 becomes the maximum and the magnitude of the AC component b contained in the monitored signal may be obtained, which proportional to the average output power of the LD 7b. The present embodiment provides the delay unit 31 to match the phase between the dither signal and the detected signal.

Figure 2:
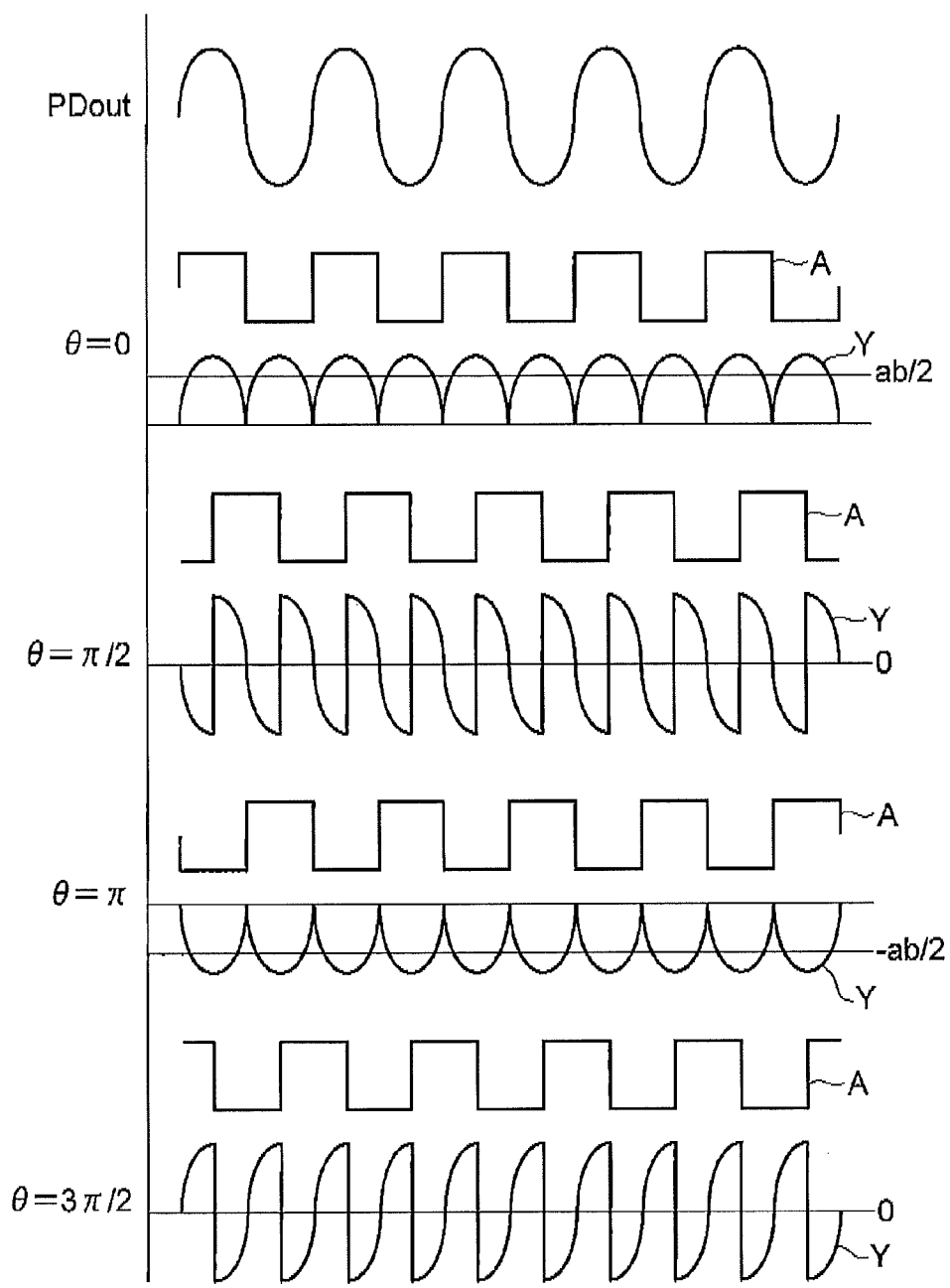
FIG. 2 schematically illustrates an output signal of a multiplier when a rectangular dither signal and a sinusoidal output of a photodiode are input to the multiplier as varying a phase difference between two signals.

FIG. 2 schematically illustrates the detected signal PDout, the dither signal A, and the outputs Y of the multiplier 33 as varying the phase between two signals, where the dither signal is assumed to be a rectangular waveform. Passing the output Y of the multiplier 33 through the LPF 45, the DC component of the output ab/2 of the multiplier 33, which is equivalent to the magnitude b of the monitored signal PDout, may be precisely detected. Thus, the magnitude of the optical output only of the LD 7b may be evaluated.

As explained above, the output of the multiplier 33 becomes a maximum when the phase difference between two signals is zero, which means that the lock-in amplifier operates as a band-pass filter with an extremely narrow bandwidth, or, the lock-in amplifier may detect a signal component whose frequency is precisely equal to the frequency of the reference signal.

The APC circuit 35b compares with the detected magnitude described above with the target magnitude Target 1, and sets a digital value in the D/A-C 55b so as to decrease the difference between two values, or to make them equal. Thus, the optical output power of the LD 7b becomes substantially equal to a value corresponding to the target magnitude Target1. Furthermore, switching the target LD to be controlled in the output power thereof by the APC circuit by the selectors, 34 and 41, under the operation of the controller 21, respective LDs, 7a to 7d, may be adjusted in the average output power thereof to be respective target power.

The invention of the present application is not restricted to the embodiment described above.

Figure 3:
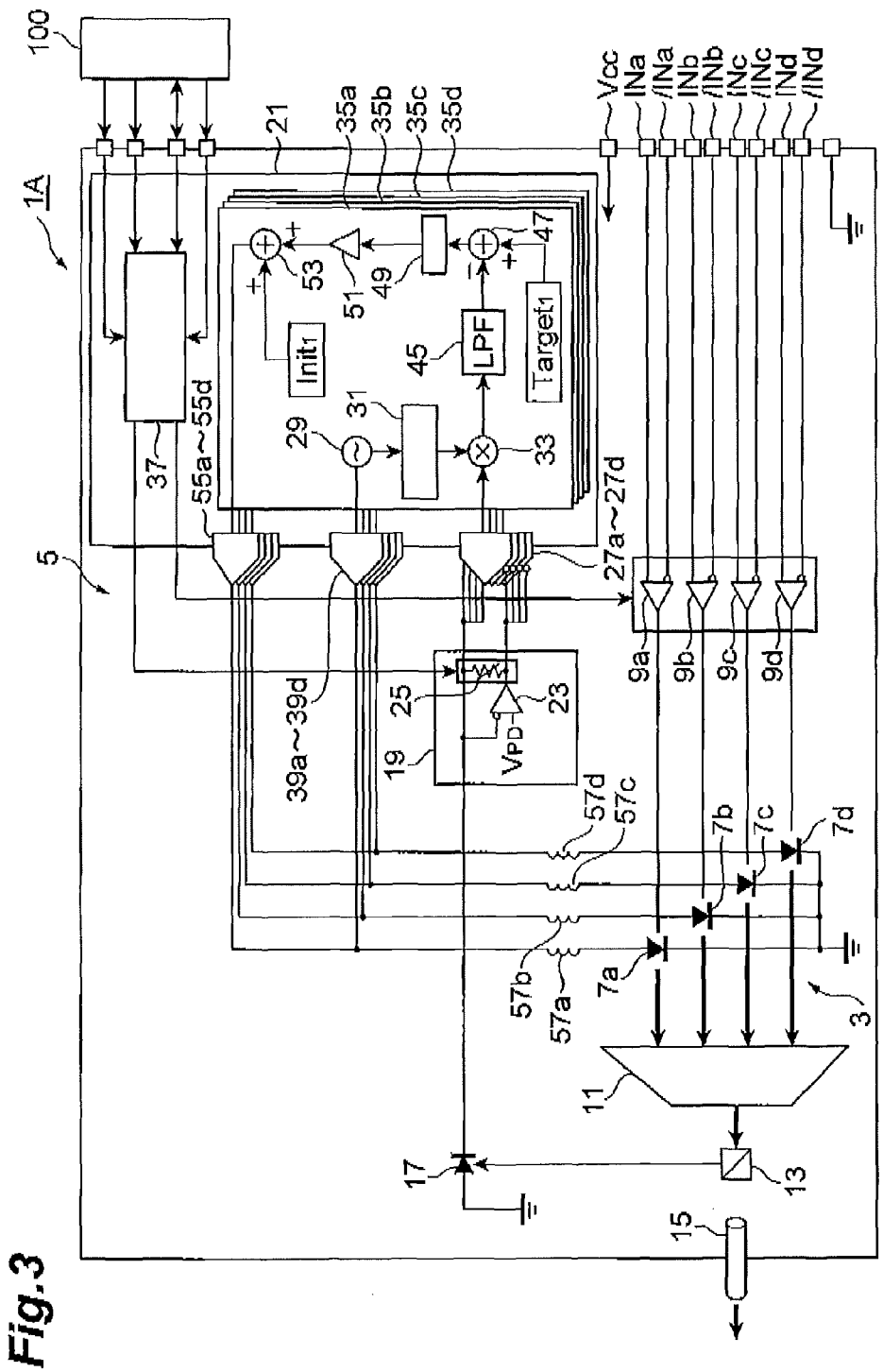
FIG. 3 is a block diagram of an optical module according to a first modification.

FIG. 3 is a block diagram of a transmitter module 1A, which is modified from those explained in FIG. 1. A feature of the modified transmitter module 1A is that the dither signal source 29, the delay unit 31, the multiplier 33, D/A-Cs 39, and A/D-C 27 are prepared for respective lanes each corresponding to the LDs, 7a to 7d. That is, each of the APCs, 35a to 35d, builds in the extractor with a frequency specific thereto. However, the monitor PD 17 is still common to all LDs, 7a to 7d, that is, only one monitor PD 17 detects the branched beam that contains AC components attributed to respective LDs, 7a to 7d.

In the modified module 1A, the dither signals 29 prepared for respective APC circuit, 35a to 35d, are characterized to have specific frequencies different from others. For instance, the frequency $f_1$ of the first dither signal superposed on the first bias current for the first LD 7a is 1.0 kHz, that $f_2$ for the second dither signal superposed on the second bias current is different from the first one and set to be 1.6 kHz, that $f_3$ for the third LD 7c is 2.3 kHz, and that $f_4$ for the fourth LD 7d is set to be 3.1 kHz. It is further preferable to set the frequencies of respective dither signals not to contain common harmonics.

The bias currents each superposed with respective dither signals with specific frequencies different from others are provided to the LDs, 7a to 7d. The LDs, 7a to 7d, provided with the bias currents above described, are modulated with modulation currents provided externally and emit optical signals each containing frequency components of the dither signal and the modulation signal. The optical signals are multiplexed by the optical multiplexer into a multiplexed optical signal, a portion of which is output from the modified module 1A but rest portion is branched by the beam splitter 13 to enter the monitor PD 17. Thus, the monitor PD 17 receives an optical signal containing all frequency components, $f_1$ to $f_4$, of the dither signals.

The photocurrent generated by the monitor PD 17 is brought to the TIA 19 to convert into a voltage signal. This voltage signal also contains all frequency components of the dither signals. The output of the TIA 19 is evenly divided into respective A/D-Cs, 27a to 27d, each provided in the front end of respective APC circuits, 35a to 35d, and converted into digital signals thereby to be input to the APC circuits, 35a to 35d. Respective APC circuits, 35a to 35d, provide the multiplier to multiply the detected signal provided from the TIA 19 with dither signals specific to the APC circuits. As explained above, the multiplication of the detected signal with the dither signal may be regarded as a type of a filtering by an extremely narrowed bandwidth. Signal components contained in the monitored signal but frequencies thereof not identical with that of the dither signal resultantly have a phase unmatched to that of the dither signal. That is, the phase difference between two signals periodically varies between 0 and $2\pi$; then, the DC component of the multiplication disappears at the output thereof. Signals with a frequency identical with that of the dither signal appear in the output of the multiplier 33 as a DC value. Moreover, this DC value becomes the maximum when the phase difference between two signals becomes zero. Accordingly, even the dither signals have specific frequencies close to each other, respective APC circuits, 57a to 57d, may precisely extract only one signal component whose frequency is identical with the dither signal of the present APC circuit.

One of substitutions of the lock-in amplifier is a band-pass filter accompanied with a narrow pass-band. However, even such a band-pass filter is operable; the band-pass filter would be influenced by neighbor frequencies when the dither signals have respective frequencies very close to each other, which is hard to detect the output power from an LD. Widening the span between frequencies in order to use a band-pass filter, the TIA is necessary to have a wider frequency response. The detection of the optical output power depends on the frequency response of the TIA. The lock-in amplifier of the present embodiment enables the detection of the optical output power even when the dither signals each has a frequency very close to each other.

The arrangement shown in FIG. 3 provides one TIA 19. However, the circuit may provide four TIAs each corresponding to the APC circuits, 35a to 35d. In this arrangement, the photocurrent generated by the PD 17 is divided into four TIAs 19 and easily affected by ambient noises, in particular, the EMI noise on the path from the PD 17 to the TIAs 19. Thus, it is preferable for the circuit to provide only one PD 17 and one TIA 19 as shown in the transmitter optical module 1A. On the other hand, when one TIA 19 receives the photocurrent from one PD 17, the TIA 19 easily saturates when the optical output power of the LDs, 7a to 7d, are set to be high enough. In this case, the TIA 19 is necessary to have a wide dynamic range.

Figure 4:
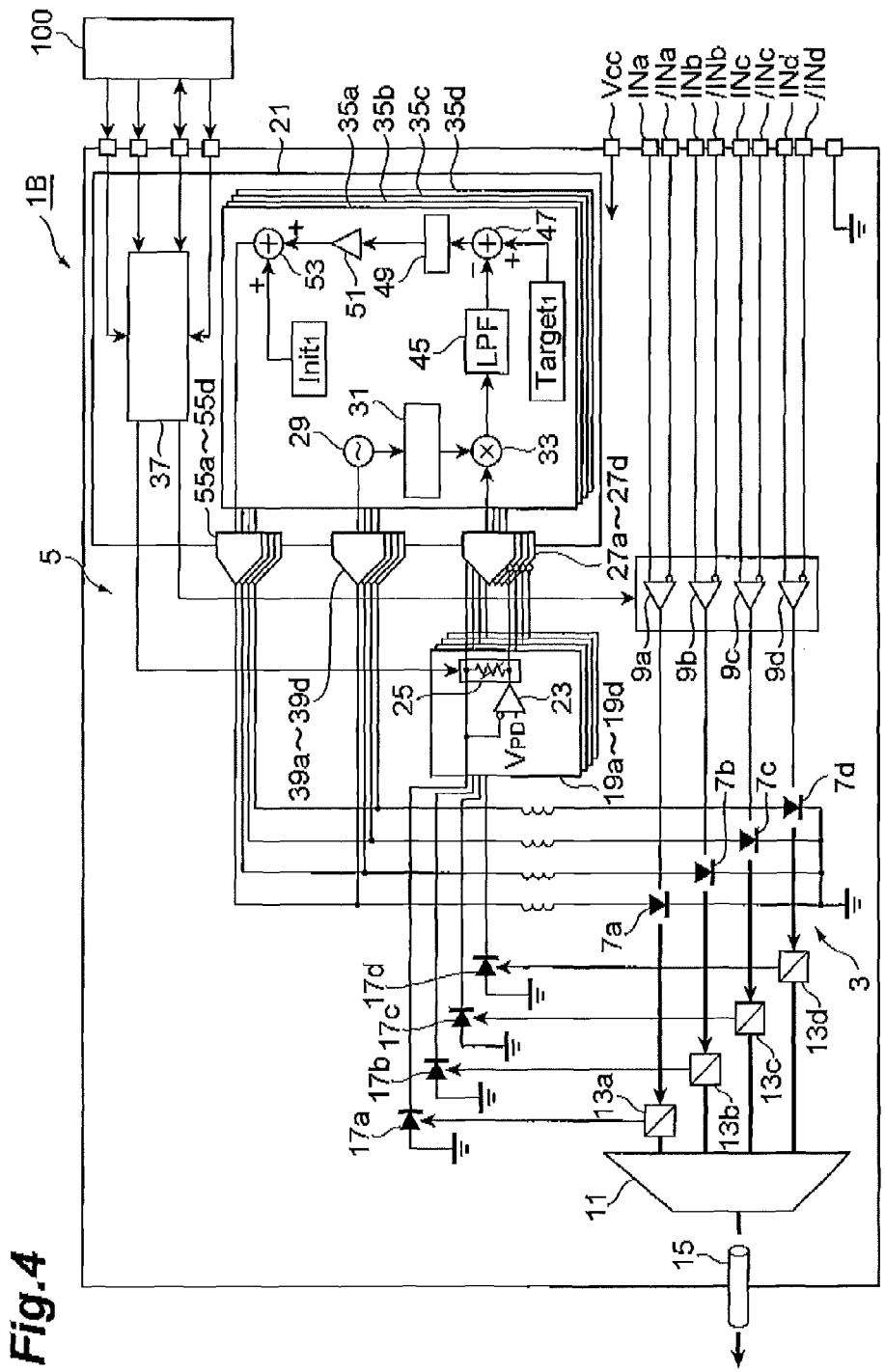
FIG. 4 is a block diagram of an optical module according to the second modification.

FIG. 4 is a block diagram of a transmitter optical module 1B of another embodiment. The transmitter module 1B, compared with the aforementioned module 1A shown in FIG. 3, provides four monitor PDs, 17a to 17d, each corresponding to LDs, 7a to 7d. In addition, the transmitter module 1B provides four beam splitters, 13a to 13d, also corresponding to LDs, 7a to 7d, each divides output beams from respective LDs, 7a to 7d, into two parts, one is for the monitor PD, 17a to 17d, while, the other is for the optical multiplexer 11. The transmitter module 1B further provides four TIAs, 19a to 19d, four A/D-Cs, 27a to 27d, and four APC circuits, 35a to 35d. That is, the transmitter optical module 1B provides four lanes each operable in completely parallel, where one lane includes one LD, one PD, one TIA, one A/D-C, and one APC circuit.

When four LDs, 7a to 7d, are enclosed in a single package, in particular, when the LDs or PDs are closely arranged to each other, each of the PDs, 17a to 17d, receives optical signals not only the LD corresponding thereto but others coming from LDs neighbor to the target LD. Most part of the light received by the PD depends on the target LD, but, it is restricted in the most part and could not be restricted to only the target PD. Under such a situation, the APC for the peculiar LD, 7a to 7d, operated based on the output of the PD, 17a to 17d, corresponding to the LD, the optical power output from the LD could not be maintained in a preset power. In an embodiment shown in FIG. 4, each of the outputs of the PDs, 17a to 17d, reflects all of the outputs of the LDs, 7a to 7d, each having specific wavelength but each of the wavelengths contains a dither frequency, $f_1$ to $f_4$, different from others. The outputs of the PDs, 17a to 17d, are converted to respective voltage signals by TIAs, and only one of frequency components, $f_1$ to $f_4$, is extracted from thus converted voltage signals by the lock-in operation. The extracted signals reflect respective output of one of LDs, 7a to 7d, including the specific dither frequency; accordingly, the extracted output by the lock-in operation is fed back to the LD, 7a to 7d, to adjust the optical output power thereof.

The transmitter modules, 1A and 1B, adjusts the bias currents for respective LDs, 7a to 7d, concurrently; while, the transmitter module 1 performs the adjustment intermittently. Accordingly, the transmitter modules, 1A and 1B, enhances the response of the adjustment of the bias current. However, the transmitter modules, 1A and 1B, requires the lock-in amplifier as many as the number of lanes, or channels, which brings the increment of the size of the digital controller. One solution against the increase of the circuit size is to combine the schemes of the transmitter module 1 and other modules, 1A and 1B. That is, an arrangement where two lanes commonly provide a lock-in circuit makes two subjects above described in compatible.

Figure 5:
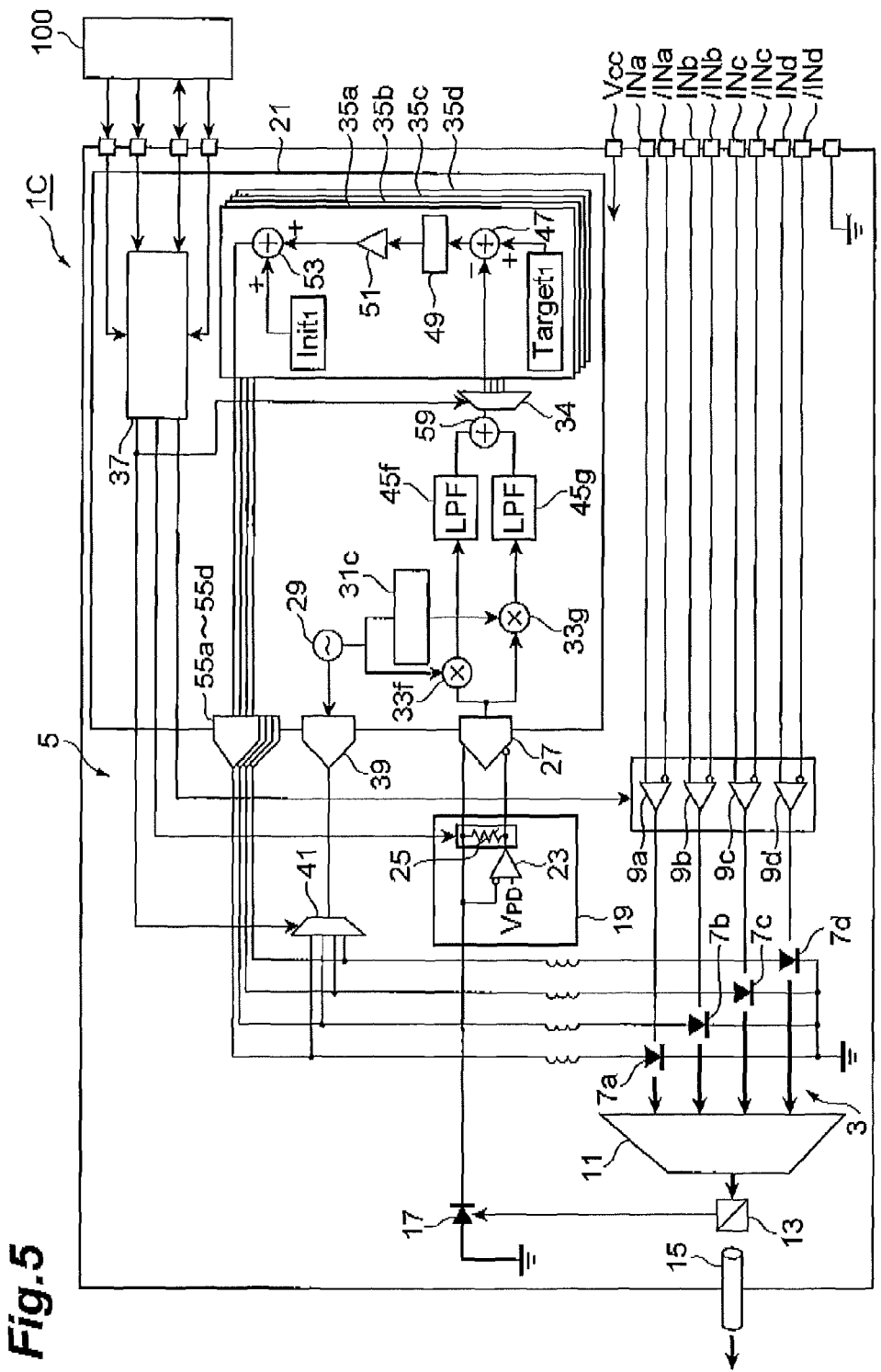
FIG. 5 is a block diagram of an optical module according to the third modification.

FIG. 5 is a block diagram of a still another example of the transmitter module. The transmitter module 1C provides, compared to those of the module 1, a modified controller 21. Specifically, the aforementioned transmitter modules, 1 to 1B, provides a delay unit 31 between the dither signal source 29 and the multiplier 33 to match the phase of the signal coming from the TIA with that of the dither signal. Since the signal path from the PD 17 to the multiplier 33 does not include elements that delays and/or advances the phase of the detected signal from the PD 17, two signals entering the multiplier 33 in the phases thereof are not widely discrepant from each other. However, evaluating in detail, the A/D-C 27 leaves a room to delay the signal passing therethrough. The adjustment of the phase of the signal for respective lanes individually is anyway troublesome.

The transmitter module 1C shown in FIG. 5 omits the delay unit 31 to adjust the phase but provides a phase shifter 31c, two multipliers, 33f and 33g, two LPFs, 45f and 45g, and an adder 59. Specifically, the dither signal is divided into two parts, one of which is directly coupled with one of the multipliers 33f, while, the other is coupled with another multiplier 33g through the phase shifter 31c that shifts the phase of the signal input thereto rigidly by π/2 (90°). Multipliers, 33f and 33g, multiply the output of the A/D-C 27 with the original dither signal and the phase-shifted dither signal, respectively. The former multiplier 33f gives a cosine component (0°) of the detected signal, while, the other multiplier 33g gives a sine component (90°) of the detected signal. The addition of two outputs of the multipliers, 33f and 33g, is equivalently to the vector sum independent of the phase difference between the detected signal and the dither signal. The output of the adder 59 is provided to respective APC circuits, 35a to 35d, to be provided in the control of the optical output power of the LDs, 7a to 7d.

The configuration of the lock-in circuit shown in FIG. 5 that provides the phase shifter 31c is preferably applicable to the transmitter modules, 1A and 1B.

Figure 6:
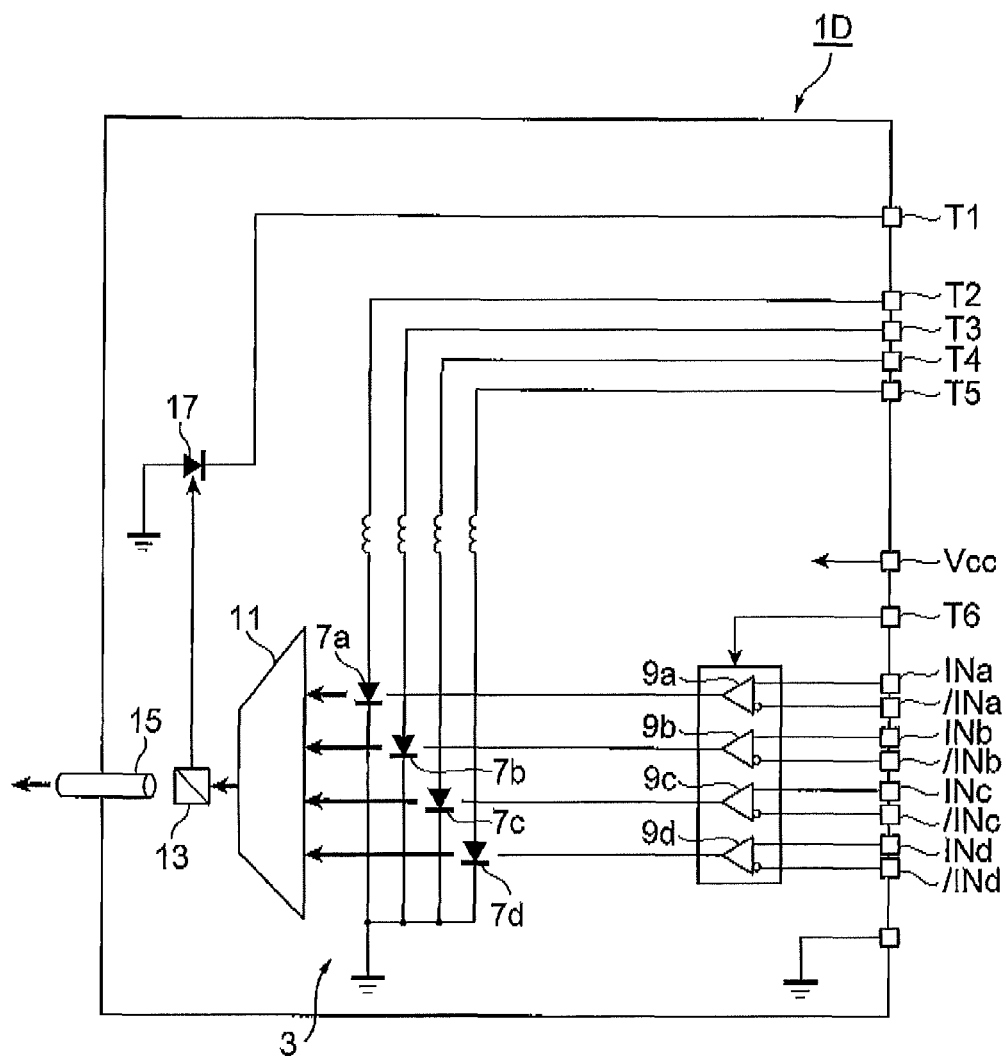
FIG. 6 is a block diagram of an optical module according to the fourth modification.

FIG. 6 shows still another modification of the transmitter modules 1D. The arrangement 1D shown in FIG. 6, compared with the aforementioned modules, 1 to 1C, puts a portion of, or a whole of the electrical unit 5 out of the module 1D. The electrical unit 5 is electrically connected with the transmitter module 1D through a plurality of terminals, T1 to T6, prepared in the package into which the transmitter module 1D is enclosed. Continuous request in the field of the optical module, for instance, one of multi-source agreements of the QSFP+ optical transceiver, has made a package of the module in compact, which makes hard to build a control unit within the package. A modified arrangement is fascinated where only LDs, drivers to drive respective LDs, and PDs to monitor an output of respective LDs are built within the package; while, circuits around the dither signal to perform the lock-in operation are put out of the package. Although terminals necessary to be prepared in the package increases, at least terminals each for providing the bias current to respective LDs become inevitable, such an arrangement makes the inside of the package to be simple and compact.

The transmitter modules, 1 to 1D, superposes an AC signal, the dither signal, on the bias current is undesirable from a viewpoint of the dispersion of the optical output because the superposed AC signal increases the chirp. When the LDs are directly modulated, that is, each of the LDs is provided with the bias current of the DC signal superposed with a modulation current of the AC signal, the dither signal attributed with AC components expands an optical HIGH level and that of LOW level. Accordingly, the AC signal should be small as possible, in other words, the modulation factor given by a ratio of the AC component against the DC component should be smaller than 1%. To reduce the modulation factor means that the AC components involved in the monitored signal decreases.

When the AC components are detected only by filtering the monitored signal, the signal to noise ratio (S/N) of the monitored signal decreases and makes it hard to recover the monitored signal satisfactorily. The lock-in amplifier like the present application, which is equivalently regarded as a filter with an extremely narrow bandwidth, enables to detect only one signal whose frequency becomes equal to that of the reference signal. When the frequency of the detected signal shifts from the frequency of the reference signal, which means that the phase of the detected signal mismatches with that of the reference signal; the magnitude of such signals resultantly disappears. Then, only the signal with a phase identical with that of the reference signal is detected. Thus, in a transmitter module that includes a plurality of LDs each emitting light with a wavelength specific thereto and different from others, the configuration of the present application; that is, a bias current accompanied with an AC signal whose magnitude is relatively smaller so as not to affect the optical status of the LD and the bias current is controlled based on the magnitude of the AC component of the monitored signal enables to control the optical output power precisely.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A transmitter optical module, comprising:
   a plurality of semiconductor laser diodes (LDs) each emitting an optical signal with a wavelength specific thereto and different from others;
   an optical multiplexer configured to multiplex optical signals into a multiplexed optical signal;
   a semiconductor photodiode (PD) configured to receive the multiplexed optical signal and generate a detected signal;
   an extractor including an electrical signal source to provide an electrical signal having a specific frequency, a delay unit configured to adjust a phase of the electrical signal and a multiplier; and
   a controller including a plurality of auto-power control (APC) circuits each corresponding to the LD and providing a bias current to the LD corresponding thereto,
   wherein the electrical signal is superposed on the bias current one after another and the extractor extracts a component having the specific frequency by multiplying the electrical signal whose phase is adjusted by the delay unit with the detected signal, the bias current being determined by the component extracted by the extractor.

2. The transmitter optical module of claim 1,
   wherein the delay unit in the extractor adjusts the phase of the electrical signal to be synchronous with the detected signal.

3. The transmitter optical module of claim 2,
   wherein each of the APC circuits further includes a low-pass-filter to pass low frequency components of an output of the extractor.

4. The transmitter optical module of claim 2,
   wherein the extractor further includes a low-pass-filter to pass low frequency components of an output of the multiplier.

5. The transmitter optical module of claim 1,
   wherein the extractor further includes another multiplier and an adder,
   wherein the delay unit delays the electrical signal by 90° to generate another electrical signal,
   wherein the multiplier multiplies the electrical signal with the detected signal to generate a first multiplied signal and the another multiplier multiplies the another electrical signal with the detected signal to generate a second multiplied signal, and the first multiplied signal is added to the second multiplied signal to generate the component with the frequency.

6. The transmitter optical module of claim 1, wherein the extraction of the component is digitally carried out by the controller.

7. A transmitter optical module, comprising:
a plurality of semiconductor laser diodes (LDs) each emitting an optical signal with a wavelength specific thereto and different from others;
an optical multiplexer configured to multiplex optical signals into a detected optical signal;
a semiconductor photodiode (PD) configured to receive the multiplexed optical signal and generate a detected signal; and
a controller including a plurality of auto-power control (APC) circuits each corresponding a the LD, each of the APC circuits having an extractor including an electrical signal source to provide an electrical signal with a specific frequency different from others, a delay unit configured to adjust a phase of the electrical signal, and a multiplier, each of the APC circuits providing a bias current to the LD corresponding thereto,
wherein each of the APC circuits superposes the electrical signal with the frequency specific thereto on the bias current; extracts from the detected signal a component with the specific frequency by multiplying the electrical signal whose phase is adjusted by the delay unit with the detected signal; and determines the bias current based on the component extracted by the extractor.

8. The transmitter optical module of claim 7, wherein each of the delay unit in respective APC circuits adjusts the phase of the electrical signal to be synchronous with the detected signal.

9. The transmitter optical module of claim 8, wherein each of the APC circuits further includes a low-pass-filter to pass low frequency components of an output of the multiplier.

10. The transmitter optical module of claim 7, wherein each of the APC circuits further includes another multiplier and an adder,
wherein the delay unit delays the electrical signal by 90° to generate another electrical signal,
wherein the multiplier multiplies the electrical signal with the detected signal to generate a first multiplied signal and the another multiplier multiplies the another electrical signal with the detected signal to generate a second multiplied signal, and the first multiplied signal is added to the second multiplied signal to generate the component with the frequency.

11. The transmitter optical module of claim 7, wherein the extraction of the component is digitally carried out by the controller.

12. A transmitter optical module, comprising:
a plurality of semiconductor laser diodes (LDs) each emitting an optical signal with a wavelength specific thereto and different from others;
an optical multiplexer configured to multiplex optical signals into a multiplexed optical signal;
a plurality of semiconductor photodiodes (PDs) each configured to receive the optical signal emitted from the LD and generate a detected signal; and
a controller including a plurality of auto-power control (APC) circuits each corresponding a combination of the LD and the PD, each of the APC circuits having an extractor including an electrical signal source to provide an electrical signal with a specific frequency different from others, a delay unit configured to adjust a phase of the electrical signal and a multiplier, each of the APC circuits providing a bias current to the LD corresponding thereto,
wherein each of the APC circuits superposes the electrical signal with the frequency specific thereto on the bias current; extracts from the detected signal a component with the specific frequency by multiplying the electrical signal whose phase is adjusted by the delay unit with the detected signal; and determines the bias current based on the component extracted by the extractor.

13. The transmitter optical module of claim 12, wherein each of the delay unit in respective APC circuits adjusts the phase of the electrical signal to be synchronous with the detected signal.

14. The transmitter optical module of claim 12, wherein each of the APC circuits further includes a low-pass-filter to pass low frequency components of an output of the multiplier.

15. The transmitter optical module of claim 12, wherein each of the APC circuits further includes another multiplier and an adder,
wherein the delay unit delays the electrical signal by 90° to generate another electrical signal,
wherein the multiplier multiplies the electrical signal with the detected signal to generate a first multiplied signal and the another multiplier multiplies the another electrical signal with the detected signal to generate a second multiplied signal, and the adder adds the first multiplied signal to the second multiplied signal to generate the component with the frequency.

\* \* \* \* \*